Figure 1:
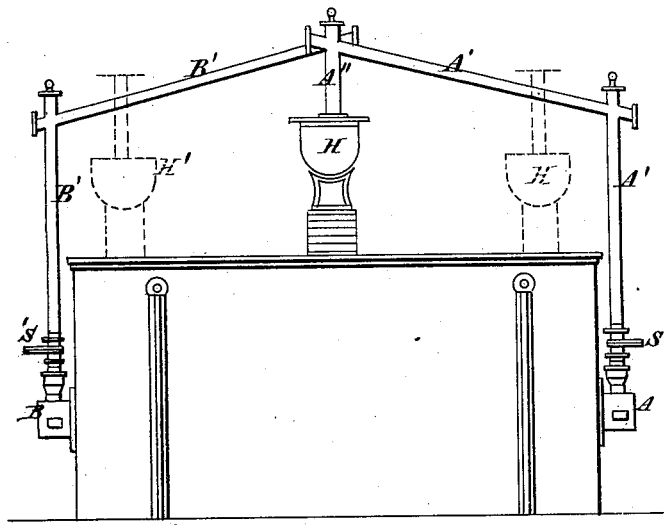

L. A. L. E. P. DE LA PEYROUSE.
Process of Manufacturing Gas.

No. 200,182.  Patented Feb. 12, 1878.

WITNESSES:
Wm. A. Skinkle
E. E. Davidson

INVENTOR:
L. A. L. E. P. de la Peyrouse
By his Attorneys
Baldwin, Hopkins & Peyton 4 Sheets—Sheet 2.

L. A. L. E. P. DE LA PEYROUSE.
Process of Manufacturing Gas.

No. 200,182.   Patented Feb. 12, 1878.

WITNESSES:
Wm. A. Skinkle.
E. L. Davidson

INVENTOR:
L. A. L. E. P. de la Peyrouse.
By his Attorneys
Baldwin, Hopkins & Peyton

N. PETERS, PHOTO-LITHOGRAPHER, WASHINGTON, D. C.

L. A. L. E. P. DE LA PEYROUSE.
Process of Manufacturing Gas.

No. 200,182. Patented Feb. 12, 1878.

WITNESSES:

INVENTOR:
L. A. L. E. P. de la Peyrouse,
By his Attorneys
Baldwin, Hopkins & Peyton L. A. L. E. P. DE LA PEYROUSE.
Process of Manufacturing Gas.

No. 200,182. Patented Feb. 12, 1878.

WITNESSES:

INVENTOR:
L. A. L. E. de la Peyrouse,
By his Attorneys
Baldwin, Hopkins & Peyton.

UNITED STATES PATENT OFFICE.

LOUIS A. L. E. P. DE LA PEYROUSE, OF LONDON, ENGLAND.

IMPROVEMENT IN PROCESSES OF MANUFACTURING GAS.

Specification forming part of Letters Patent No. 200,182, dated February 12, 1878; application filed March 13, 1877; patented in England, August 15, 1876.

*To all whom it may concern:*

Be it known that I, LOUIS AIMÉ LEO ELIE PICOT DE LA PEYROUSE, M. D., of 4 Finsbury Circus, in the city of London, have invented a new and useful Improvement in the Process of Manufacturing Gas, which improvement is fully set forth in the following specification, reference being had to the accompanying drawings.

This invention relates to improvements in the production of ordinary illuminating-gas.

The improvements have for their object to obtain from a given quantity of coal a greater volume of gas, both purer and of higher lighting power than gas as now made, consequently insuring a great economy in the production of ordinary lighting-gas, whether it be manufactured from coal or from oil, wood, resin, bitumens, petroleum oils, tars, either alone or together with coal or coke.

By the various processes commonly employed at the present time at gas-works a greater or lesser portion of the volatile products obtained from coal by heat condenses or splits up to form a series of by-products, which contain hydrogen, necessary for the production of bicarbureted hydrogen or olefiant gas, which, with acetylene, propylene, and butylene, forms the greater part of illuminating-gas.

The cause of the small quantity of lighting-gas ordinarily obtained is, therefore, the loss of hydrogen, which, instead of forming lighting-gas, is taken up in the formation of water, lightly carbureted hydrogen, sulphureted hydrogen, ammonia, tar, empyreumatic or essential oils, all of them formed to the detriment of the lighting-gas, of which hydrogen is the principal constituent. Such a gas necessarily requires purification.

It is well known that the tar and empyreumatic or essential oils separate and condense on cooling. By means of lime the carbonic acid is fixed. The ammoniacal salts and sulphureted hydrogen being soluble in water, the gas is washed to free it from these hurtful products, but acetylene and olefiant gas being also partly soluble in water, a new source of impoverishment of the lighting-gas arises. To remedy this state of things, gas-coal has been distilled in retorts of different temperatures, but without (so far as my knowledge extends) perfectly satisfactory result. In fact, when coal is submitted to the lowest temperatures at which the volatile products are generated it produces a vast quantity of by-products and but a small quantity of better lighting-gas.

A high temperature produces a greater volume of gas, but it is lighter, and its lighting power is weaker. The high temperature has also the disadvantage of choking up with a sooty deposit the pipes by which the gas is led off. A medium temperature gives neither economy nor a sufficient quantity of gas. These are well-known facts.

It will be readily understood, then, that many efforts have been made to prevent or compensate for the loss of hydrogen—such, for instance, as furnishing to the coal during its volatilization a quantity of hydrogen from extraneous sources, as, for example, hydrogen arising from the decomposition of superheated steam, or of oil thrown onto incandescent coal, or naphtha, or solid or liquid bitumens, together with resin, &c.; also, by charging alternately the different portions or opposite ends of a single or through retort, or the different retorts of a series or twin retorts, and causing the vapors produced from a second or fresh charge to pass through or in contact with the previously and highly heated partially-exhausted charge, and combined with the gaseous products thereof. I am not aware that any of these processes are successful or generally adopted in practice.

The true method of producing gas will be that which will prevent to the fullest extent the condensation of the watery and hydrocarbureted vapors generated in the distillation of coal, and which, consequently, will prevent the formation of by-products by causing these vapors, so soon as they are generated, and by the immediate influence of a higher temperature, to pass into a gaseous state. Such gases will be rich, pure lighting-gases, and will not require the washing process.

The kinds of apparatus which, in continuous working, are for the shortest time exposed to cooling, and the different parts of which can at pleasure be continuously heated to different temperatures, as hereinafter described, will be the most suitable for attaining the desired end.

According to my invention, I effect the above operation either in a single through retort—that is a retort closed at each end with a mouth-piece—having at each end an ascension-pipe, and heated by a separate furnace at each end, or I effect the operation in two or more retorts placed side by side, called "twin retorts," communicating with one another and heated by separate furnaces.

The retorts I work in the manner hereinafter described.

Mode of working in single retorts and in twin retorts: If single retorts are used, such as shown at Figs. 1, 2, 3, 4, 5 and 6, a charge is, at starting, introduced into one-half only of the retort O, Fig. 3, from the side A, for example. The opposite extremity will be closed, and the valve S' on the ascending pipe B' will be opened to allow the products of distillation of the coal to pass off.

When the greater part of the volatile products contained in the coal have been driven off, the valve on the ascending pipe B' will be closed and that on the ascending pipe A' opened. A charge of coal will be introduced at the extremity B into the empty half of the retort, and the retort then closed at that end. The vapors produced from the last charge of coal introduced at the end B will consequently have to pass away through the incandescent coal or coke in the first half, A, and the resulting gaseous products leave the retort by the pipe A'. The results sought for now commence to be obtained, the heat being properly regulated by the separate furnaces, as hereinafter described.

A small test gas-burner (not shown) attached to each of the ascending pipes A' B' at the two ends of the retort will show the quality of gas produced.

When the quality of the gas shows that its illuminating power is diminishing, the operation is stopped to empty the half of the retort containing the coke, as care must be taken not to completely exhaust the partially-formed coke of gaseous products, as then absorption and decomposition of the illuminating-gases passing through it would take place. The valve S on the ascending pipe A' is then closed and that on the ascending pipe B' opened. The end A of the retort is emptied and the coke withdrawn, and is at once replaced by a new charge of coal, the vapors from which will, in their turn, pass through the partly-carbonized coal in the end B, and in this way the operation is carried on continuously. Decrease of temperature, always prejudicial to the end to be obtained, is thus avoided.

It will be seen that the retort rests over two distinct furnaces, formed in such a way as to give at pleasure different temperatures to the two halves of the retort. The highest temperature is applied to that half of the retort which contains the partially-carbonized coal, through which the vapors from the new charge of coal have to pass. This half is maintained at a high temperature, but as uniform as possible.

To facilitate the passage of the gaseous products the coke may be broken from time to time.

Twin retorts: When multiple retorts are used, Figs. 8, 9, 10, 11, 12, and 13, the operation is conducted in the manner following: The first charge of coal is introduced into one only of the two retorts—say, for example, the retort O. When this retort has been filled the opening A into such retort is closed, taking care also to close the valve S on its ascending pipe A', while the valve S' on the ascending pipe B' of the retort O' is opened.

Under the influence of the heat the products vaporized from the coal in the retort O pass off through the empty retort O' and its ascending pipe B'. So soon as the greater part of the volatile products of the coal in the retort O have been driven off, the valve S on the ascending pipe A' is opened and that of B' closed, and a charge of coal is introduced into the retort O'. The volatile products coming from the retort O' pass from back to front through the retort O, and are converted into lighting-gas, which is conveyed away by the pipe A'.

When the coal contained in the retort O is nearly exhausted, which will be known by the light given by the test-burner, the valve S of the retort O is closed and that S' of O' opened, and a new charge of coal is introduced into O. The volatile products of the retort A have then to pass through the partially-carbonized coal in the retort O', and are led away by its ascending pipe B'. The alternate charging of the retorts O and O' is carried on continuously, as above described, whereby the operation is rendered continuous, and the coolings which take place will not be of importance.

It will be seen that there are two separate furnaces—the one for the retort O, the other for the retort O'. A high uniform temperature can thus be maintained in the retort containing the partially-carbonized products, through which the vaporized products from the other retort have to pass. In a similar manner the process above described may be carried out with these retorts—one containing the fresh charge of coal, the other the partially-formed coke.

By the means above described the by-products are reduced to a minimum and the hydrogen which would have gone to compose them is used in the production of lighting-gas. The gas produced will contain little or no ammonia, and the nitrogen contained in the coal will enter into combination with carbon in lieu of forming ammonia.

The gas produced may be purified by being passed through the ordinary dry purifiers; first, through a lime-purifier, charged with lime well sprinkled with oxygenated water, or with a solution of some salt containing a large quantity of oxygen, which it can give up without difficulty. The other trays are, as usual, charged with oxide of iron; but the last tray will be charged with a sufficient quantity of slaked lime, to retain the carbonic acid and the sulphurous products remaining in the gas.

The letters of reference used apply to the same parts in the two systems of apparatus.

Figs. 1, 2, 3, 4, 5, 6, 7 show a set of single retorts, similar to ordinary retorts, except that they can be opened at both ends, and can be charged alternately at either end, while the gaseous products are led off in the same manner. Figs. 8, 9, 10, 11, 12, 13, 16 show details of the system of multiple or twin retorts.

A A A B B B, mouth-pieces of retorts, (one opened, the other closed,) by which the contents of the retort is alternately charged and discharged; A' B', ascension-pipes; A'' B'', dip-pipes; C, union of the twin retorts; D, separating-partition and flue-walls; E, horizontal and vertical flues; F, furnace below the retort O; F', furnace below the retort O'; H H', hydraulic mains; L, cup-levers; O O', retorts; S S', sliding valve, placed on the ascending pipes; C' C' and C'' C'', cups in hydraulic mains. (See Fig. 16.)

Figure 2:
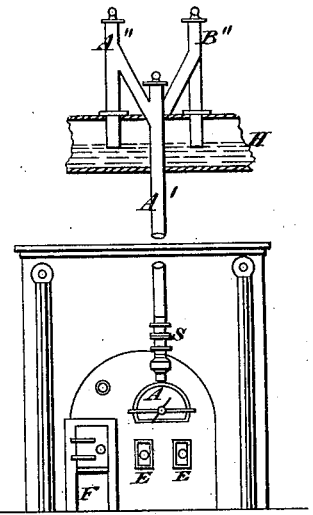

Figs. 1 and 2, side view and front view, in elevation, of a single through-retort, with two furnaces, F F', two mouth-pieces, A B, two ascending pipes, A' B', two descending dip-pipes, A'' B'', and two valves, S S', on the ascending pipes and hydraulic main H.

Figure 3:
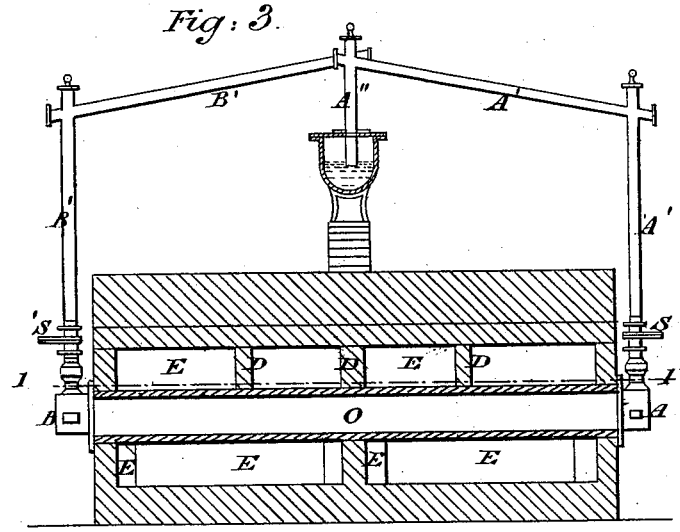
Figure 4:
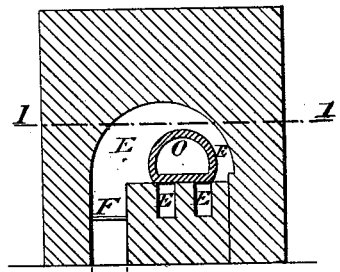
Figure 16:
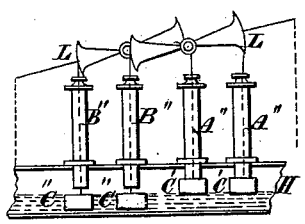

Figs. 3 and 4, longitudinal and transverse sections of Figs. 1 and 2, with the horizontal and vertical flues E E, retort O, and division-walls D. The furnaces F F' and sections of hydraulic main, with the position of the cups, and manner of working them by levers L L, are shown at Fig. 16; or, if preferred, and as is recommended, slide-valves S S' may be placed on the ascending pipes.

Figure 5:
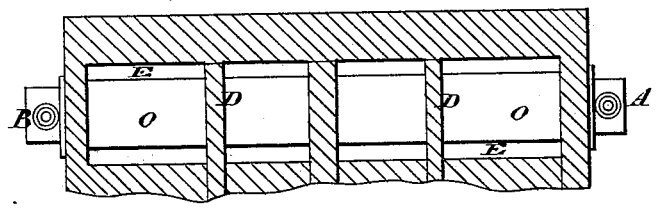

Fig. 5, horizontal section of Figs. 3 and 4, taken at the line 1 1, showing the spring of the arches, as well as the retort O on its bed, the division-walls D D, the flues E, and mouth-pieces A and B.

Figure 6:
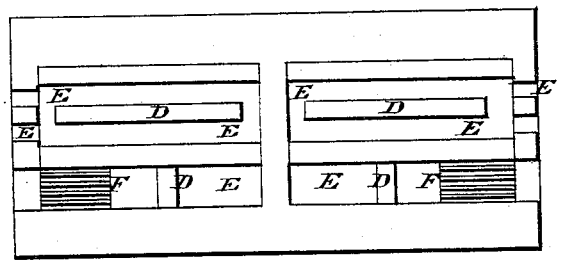

Fig. 6 is a ground plan of Fig. 3, showing the bottom and sides of the flues E below the retort O, the two furnaces F F', one furnace at each end in such manner that they can be worked separately or together, and raised to different heats.

Figure 7:
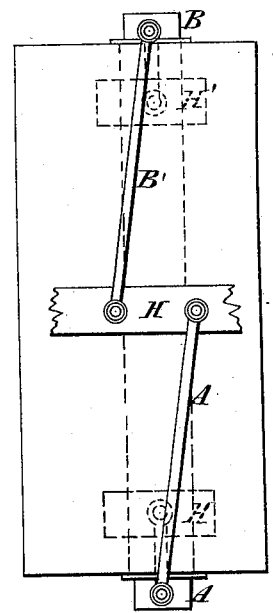

Fig. 7, plan view of Figs. 1 and 2, showing the position of the hydraulic mains, and of the ascending and horizontal pipes leading from the mouth-pieces A B of the retort O.

Figure 8:
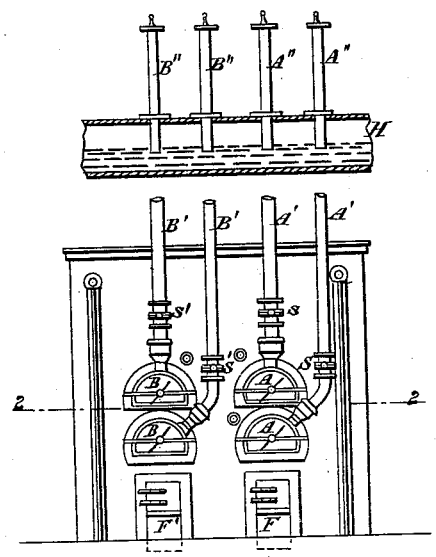
Figure 9:
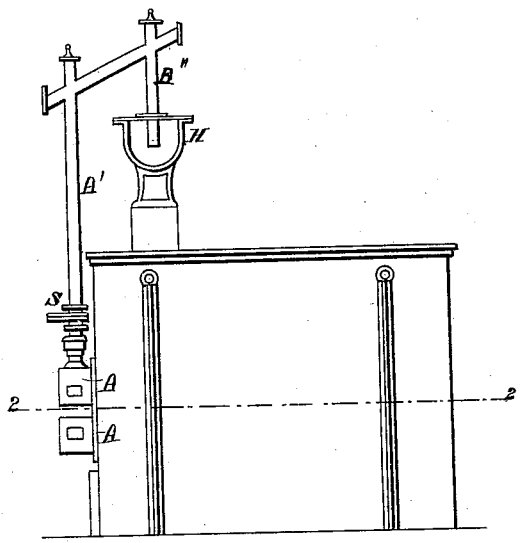

Twin retorts: Figs. 8 and 9, front and side view of a set of four twin retorts, O O' and O O', with their four mouth-pieces, A A B B, four ascending pipes, A' A' B' B', and descending dip-pipes A'' A'' and B'' B'', with four valves, S S S' S', cut-off cups C' C' C'' C'' in the hydraulic main H, and the means of operating the cups by the levers L, Fig. 16.

O O, the retorts first charged, have their pipes closed by the valves S and S. The retorts O' O' will then be free to allow gas to pass by the ascending pipes, whose valves S' and S' are open. The same result can be attained by the movement of the cups. The cups C' and C' being closed, the cups C'' and C'' will be open, Fig. 16, and vice versa, whenever it is necessary.

Figure 10:
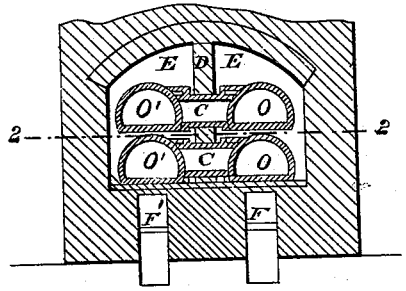
Figure 11:
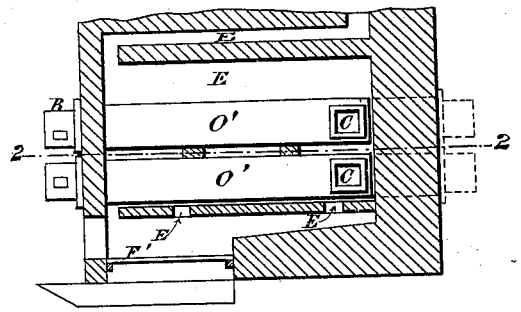

Figs. 10 and 11, longitudinal and transverse sections of Figs. 8 and 9, showing the twin retorts O O' O O', with their connections C C, division-walls D D, flues E E, two furnaces, F and F', with their ash-pit. These furnaces can be worked simultaneously or separately.

Figure 12:
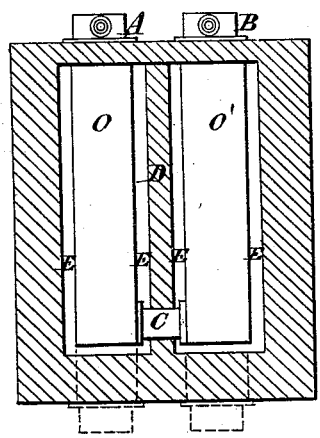
Figure 13:
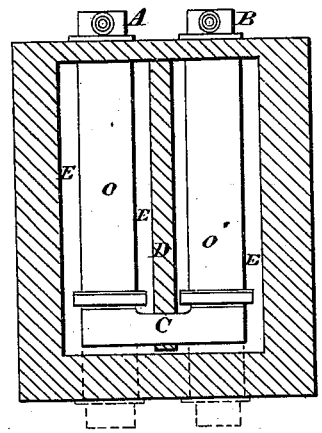

Figs. 12 and 13, horizontal section of Figs. 8, 9, 10, and 11 on the lines 2 2, showing the twin retorts on their beds, the division-walls D D, and the flues E E.

Figure 14:
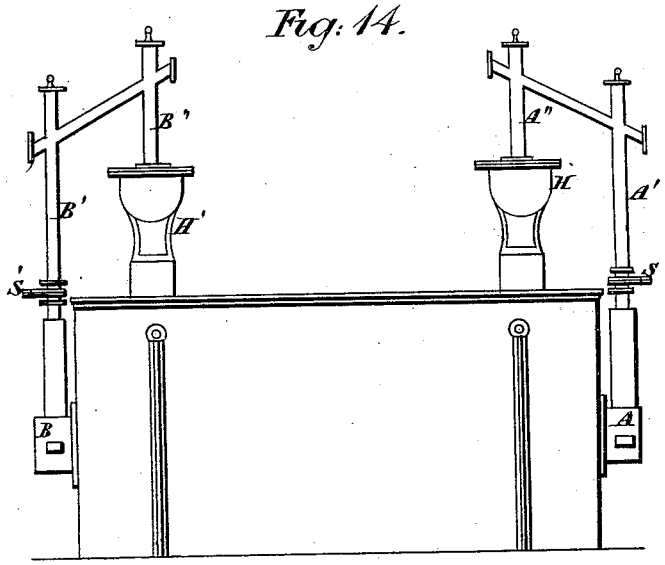
Figure 15:
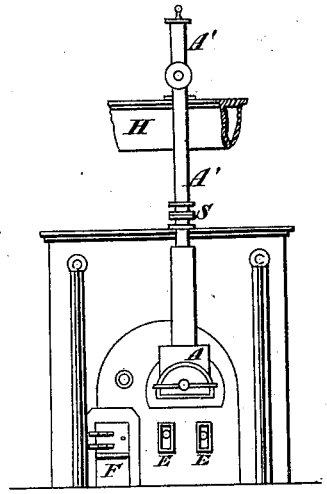

Figs. 14 and 15, side and front elevations of a set of retorts, the same as Figs. 1 and 2, with the exception that they are furnished with two hydraulic mains, H H', in place of one only. The admission of gas to the hydraulic mains can be controlled either by the two cups C' C'' suspended from a lever, L, Fig. 16, or, better, by means of valves S and S' on the ascending pipes.

Figs. 11, 12, and 13 show, in dotted lines, that the twin retorts may be continued through, so that each retort has two mouth-pieces, to allow the discharging of coke to be effected instantaneously from both sides.

Having thus described the nature of my invention, and the manner of performing the same, I would have it understood that I do not broadly claim manufacturing gas by alternately charging the retorts or portions of the retort, and passing the vaporized products of the fresh charge through the previously-charged retort or portion of the retort, in which the charge is partially exhausted and highly heated, as this is old.

What I do claim is—

The hereinbefore-described improvement in the method of manufacturing gas, (by alternately charging the retorts or different portions of a retort and causing the products of distillation of the fresher charge to pass through a previously and highly-heated partially-exhausted charge,) which improvement consists in independently heating the different charges and raising the temperature of the retort or retorts, or portion of a retort, containing the partially-carbonized material to a higher degree than that to which the fresher charge is subjected by an independent heat, and maintaining this high temperature as uniformly as possible until a time short of that at which the material of the first charge would be completely exhausted of gaseous products, then withdrawing said charge, inserting a fresh one, and passing its products through the previous and now partially-exhausted charge, which is likewise independently and highly heated, substantially as set forth.

L. A. L. E. P. DE LA PEYROUSE.

Witnesses:
WILMER M. HARRIS,
THOMAS LAKE,
Both of No. 17 *Gracechurch Street,*
*in the city of London.*